United States Patent

Vuylsteke et al.

Patent Number: 5,804,819
Date of Patent: Sep. 8, 1998

[54] METHOD FOR QUANTITATIVE VERIFICATION OF SCANNING GEOMETRY IN DIGITAL RADIOGRAPHIC READ OUT SYSTEM

[75] Inventors: Pieter Vuylsteke, Mortsel; Walter Jacobs, Blaasveld, both of Belgium

[73] Assignee: AGFA-Gevaert, Mortsel, Belgium

[21] Appl. No.: 547,401

[22] Filed: Oct. 24, 1995

[30] Foreign Application Priority Data

Oct. 27, 1994 [EP] European Pat. Off. .............. 94203122

[51] Int. Cl.⁶ .................................................. G01N 23/04
[52] U.S. Cl. ......................................... 250/252.1; 250/584
[58] Field of Search ............................ 250/252.1 R, 581, 250/582, 587, 584, 484.4

[56] References Cited

U.S. PATENT DOCUMENTS 5,420,441   5/1995   Newman et al. ........................ 250/582

*Primary Examiner*—Carolyn E. Fields
*Attorney, Agent, or Firm*—Richard J. Birch

[57] ABSTRACT

A method for quantitative verification of line-wise scanning geometry in a digital radiographic read out system. An x-ray transparent phantom substrate with an embedded ruler having a number of equidistant parallel strips that are opaque on top of a photostimulable phosphor screen so that the ruler is parallel with the direction of line-wise scanning. After x-ray exposure and scanning, the position in the scanning direction of the center of each ruler strip is computed. At least one of the following parameters is determined: average pixel sampling distance, geometric distortion value, and total scanned width.

5 Claims, 4 Drawing Sheets

METHOD FOR QUANTITATIVE VERIFICATION OF SCANNING GEOMETRY IN DIGITAL RADIOGRAPHIC READ OUT SYSTEM

FIELD OF THE INVENTION

The present invention is in the field of digital radiography and relates to quality assurance. More specifically the invention relates to a method of verifying the performance of a system for reading radiographic images stored in a photostimulable phosphor screen.

Description of the Prior Art

In the field of digital radiography a wide variety of image acquisition techniques have been developed that render a digital representation of a radiation image.

In one of these techniques a radiation image, for example an x-ray image of an object, is stored in a screen comprising a photostimulable phosphor such as one of the phosphors described in European patent publication 503 702 published on 16.09.92.

In a read out station the stored radiation image is read by line-wise scanning the screen with stimulating radiation such as laser light of the appropriate wavelength, detecting the light emitted upon stimulation and converting the emitted light into a digital signal representation.

After read-out the residual image left on the photostimulable phosphor screen is erased so that the screen is again available for exposure.

Since the image is available in a digital form, it can be subjected to various kinds of digital image processing techniques for the purpose of enhancing the image quality.

The original or enhanced image can then be transmitted to a hard copy recorder for reproduction of the image on the film size and lay-out of the radiologist's choice and/or it can be applied to a monitor for display.

The advantage of digital radiography resides i.a. in the fact that the image quality of a radiographic image can be enhanced by processing the digital image representation of said image.

However, all efforts put into image enhancement and optimization are only limited in value when there is no assurance that the performance of the applied image acquisition technique is reliable and that occasional fluctuations of the set up of the acquisition system remain between acceptable limits.

Therefore there is a need for regular verification and monitoring of various aspects of the performance of the acquisition apparatus.

This issue has already been addressed in the state of the art disclosures that are mentioned hereafter. In the article "Photostimulable Phosphor System Acceptance Testing" disclosed in the proceedings of the 1991 summer school held at the University of California, Santa Cruz between Jul. 15 and Jul. 19, 1991 some test procedures for read out apparatus of the above named kind are described.

Further the article "Optimization and quality control of computed radiography" by C. E. Willis et al.; displayed at the Radiological Society of North America 1993 Annual Meeting, relates to quality assurance procedures for computed radiography systems.

In a workshop on "Test phantoms and optimisation in diagnostic radiology and Nuclear medicine" held in Würzburg, Germany on Jun. 15–17, 1992 one embodiment of a test object and a test procedure has been presented by Agfa-Gevaert. The way in which test data are gathered, processed and interpreted and used to adjust the read out apparatus has not been disclosed.

One of the elements that needs to be verified on a regular basis is whether any geometric distortion occurs in a system for line-wise scanning a photostimulable phosphor screen and/or whether the geometric distortion is between acceptable limits.

This kind of distortion may e.g. result from one of the following factors: a deviation of the effective position of a scanning beam on the photostimulable phosphor screen relative to a theoretically expected position, an erroneous adjustment of begin and end positions of a scanning line, non-constant velocity of the scan movement etc.

Geometric distortion introduces erroneous values in the read out signal.

For example, when the speed of the motion along a scanning line of a laser beam used for stimulating an exposed photostimulable phosphor screen is not constant, this would result in a different width of the same object depending on the position of such an object on the photostimulable phosphors screen.

Also, when the scanning speed at a certain position is lower, a pixel at that position will be stimulated during a longer period of time than a pixel at another position, resulting in a higher value of the read out signal.

Control of the parameters that affect the scanning width is also very important since when this scanning width would be incorrect, some of the image might not be read out so that there is an occasional loss of information.

Adjustment of the parameters that affect geometric distortion is at first instance done in factory with high precision measuring devices, before shipment of the apparatus to the customer.

However, harsh shipment conditions may disorder the geometric characteristic of the read out device.

Also interventions by a service technician to replace parts of the read out apparatus may be a cause of geometric distortion.

Objects of the Invention

It is an object of the invention to provide a method for quality assurance of an apparatus for reading a radiation image by line-wise scanning a photostimulable phosphor screen that has been exposed to such a radiation image.

It is a further object to provide such a method for determining and controlling parameters indicative of the geometric distortion of such a scanning apparatus.

Further objects will become apparent from the description hereafter.

Statement of the Invention

The objects of the present invention are achieved by a method of verifying the performance of a system for line-wise scanning a photostimulable phosphor screen, comprising the steps of (i) positioning a phantom consisting of a substrate that is transparent to x-rays and an embedded ruler that consists of a number of equidistant parallel strips that are opaque to x-rays, on top of said screen so that the ruler is parallel with the direction of line-wise scanning, (ii) exposing a combination of screen and phantom to x-rays, (iii) scanning at least a part of the exposed screen comprising an image of said ruler by means of stimulating irradiation, detecting light emitted upon stimulation and converting the detected light into corresponding electric signal values representing a digital image, (iv) determining the position of each strip of said ruler, (v) determining at least one of the following parameters:

average pixel sampling distance as a ratio of a predetermined average distance between ruler strips and an average distance in the digital image of adjacent ruler strips computed by means of the determined position of each strip, geometric distortion value at a strip being the difference between a computed position of a ruler strip in the digital image and a predetermined position of a strip, total scanned width being the total number of image pixels in a scanning line multiplied by said average pixel sampling distance.

Verification of the scanning characteristics is in accordance with the present invention performed by analyzing the image of a phantom with an embedded ruler that comprises strips that are opaque to x-rays.

To enable analysis of the image of the ruler, it is necessary to recognize the ruler image and to select it from the remainder of the image.

By aligning the phantom relative to the screen the exact position of the ruler is known and can be stored in advance for example in a storage medium provided in a read-out apparatus.

This position can for example be represented by a row number and can be stored in advance in a storage disc in the scanning apparatus.

From this row number the position of a line within the image of the ruler is known so that the signal values pertaining to pixels within this line can be addressed, selected and analyzed.

It is however advantageous not to base the analysis on the image of a single line but to take into account the signal values pertaining to more than one line within the image of the ruler.

Pixel values at the same position within a preset number of lines surrounding the line that is identified by the above mentioned row index are averaged as is described in detail further on.

The analysis of the image of the ruler is based on at least one of the following parameters: geometric distortion value, average pixel sampling distance, total scanned width. These parameters are based on the position of the image of the strips of the ruler.

This position is determined by means of the position of the center of each of the strips in the direction of a scanning line.

A method of determining the position of the center of each of the strips is described further on.

The analysis can be performed either off-line by downloading a signal representation of the image of the phantom to a service personal computer and subjecting the downloaded data to a suitable measurement program or it can be performed in the on-line processor of the read-out apparatus running a measurement program. On-line processing has been described in a co-pending European application entitled "Verification of the performance of photostimulable phosphor read out system", filed on the same day as this application.

The results of the analysis of the image of the ruler can be displayed in different ways. They can be displayed on a monitor or printed together with acceptance levels for each of the values so that the operator can compare and occasionally adjust the read out system.

The presentation of the measurement results is preferably performed by producing an overlay that can be added to the image of the phantom before it is printed.

The signal values representing the image of the phantom and the data representing the measured results are sent to a hard copy recorder to generate (1) a reproduction of the image of the phantom and (2) an overlay representing the measurement results.

The measurement results can be represented as data as well as in the form of a plot of a curve.

It is also advantageous to store the measured results in the memory of the read out apparatus so as to have a retrievable record on the performance of the scanning apparatus.

The parameters that are determined are compared with predetermined acceptance levels. The results of these comparisons are interpreted and serve to guide a technician when adjusting components of the scanning system.

For example, deviations of the average sampling distance from the corresponding acceptance value(s) can be undone by adjusting the oscillating movement of the mirror used for deviating a laser beam along a scanning line.

If the scanned width deviates from the corresponding acceptance value, the zero position of the galvanometer movement or the path of the saw-tooth curve controlling the galvanometer movement can be adjusted. Alternatively the begin and end position of a line in an image can be adapted.

If the geometric distortion value deviates from a preset acceptance value, the slow scan movement can be adjusted.

BRIEF DESCRIPTION OF THE DRAWINGS

Particular aspects of the present invention as well as preferred embodiments thereof will be illustrated by means of the following drawings in which.

DETAILED DESCRIPTION

The geometric characteristics of a system for line-wise scanning a photostimulable phosphor screen are verified on an image of a so-called measurement phantom.

A measurement phantom consists of a flat rectangular substrate of a material that is transparent to x-rays. In this substrate a ruler is embedded. The ruler consists of multiple thin strips of a material that can attenuate x-rays, such as a metal, for example aluminum.

The strips are typically 20 mm long and 1 mm wide. They are parallel to each other and are equidistantly spaced along the whole ruler length. The spacing between individual strips is 5 mm.

The ruler covers the entire width of the phantom, i.e. about 36 cm so as to accommodate for the full scanning width. The ruler is embedded in the phantom substrate parallel to one of the sides of the phantom.

Figure 1:
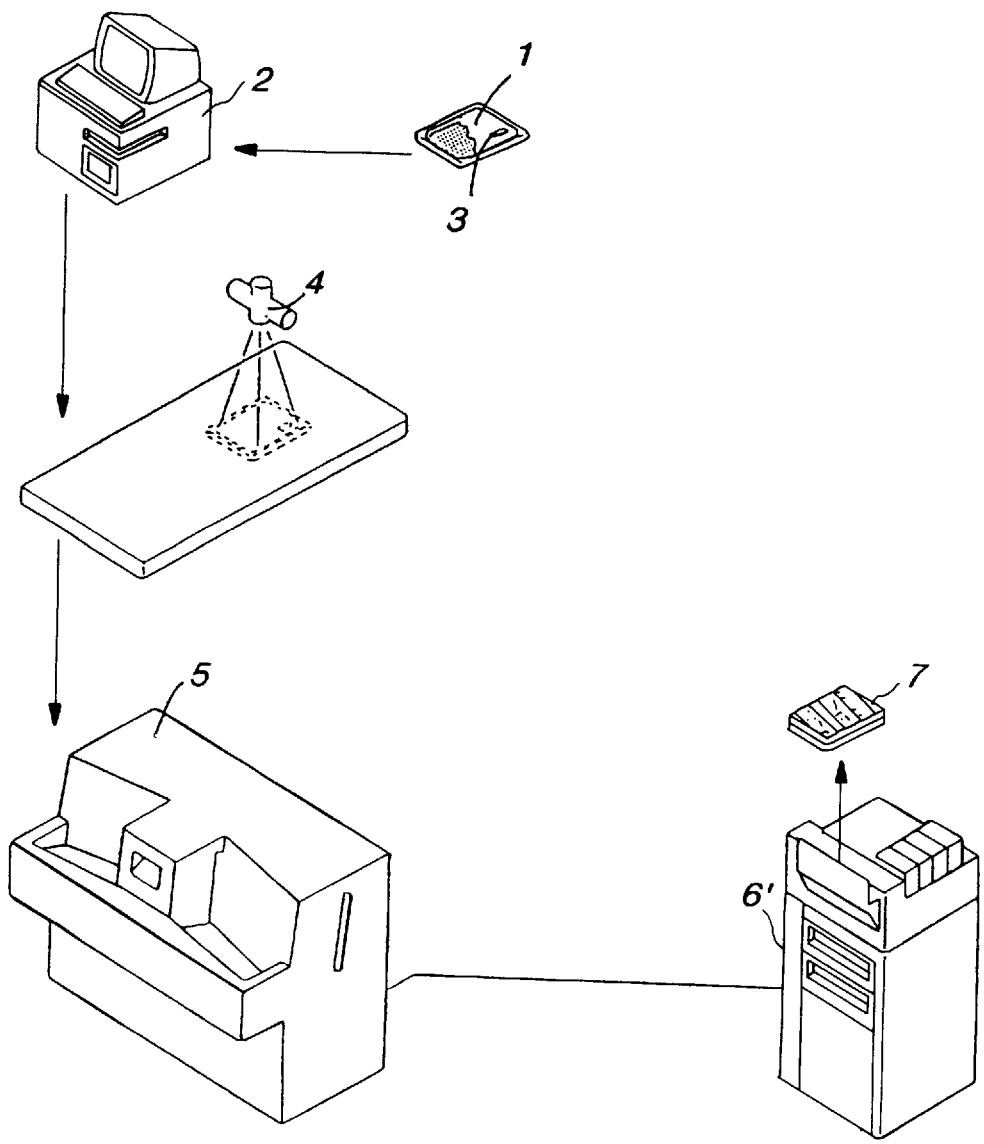
FIG. 1 is a general view of a system in which the method of the present invention can be applied.

The test procedure starts by identifying a cassette conveying a photostimulable phosphor screen, indicated by numeral (1) in FIG. 1, in an identification station (2).

The cassette is provided with an electrically erasable programmable read only memory (3) (EEPROM). In the identification station various kinds of data such as data relating to the read out conditions and/or data relating to the signal processing that is to be applied and/or to the destination of an image after read-out can be written into the EEPROM.

The cassette is fed into the identification station and from a number of available processing menu's that are displayed on the monitor of the identification station, a test menu is selected. Then an identifier indicative of this menu item is written onto the EEPROM.

Next an exposure step is performed. For this purpose, the measurement phantom is positioned on top of a cassette conveying an unexposed photostimulable phosphor screen in such a way that the ruler strips are perpendicular to the direction of line-wise scanning (fast scanning direction).

The correct position of the phantom is obtained by guiding means that serve to align the phantom with the cassette conveying the photostimulable phosphor screen.

For this purpose the phantom is provided with a number of recesses into which a cassette conveying a photostimulable phosphor screen can be positioned. For each cassette format a corresponding recess is provided.

Alternative ways of aligning phantom and cassette may be envisioned such as an assembly of pins and markers.

The combination of photostimulable phosphor screen and phantom on top of the screen is then exposed to x-rays emitted by an x-ray source (4) under normal exposure conditions.

The exposed photostimulable phosphor screen is then fed into a read-out apparatus (5) for reading the radiation image of the phantom.

Figure 2:
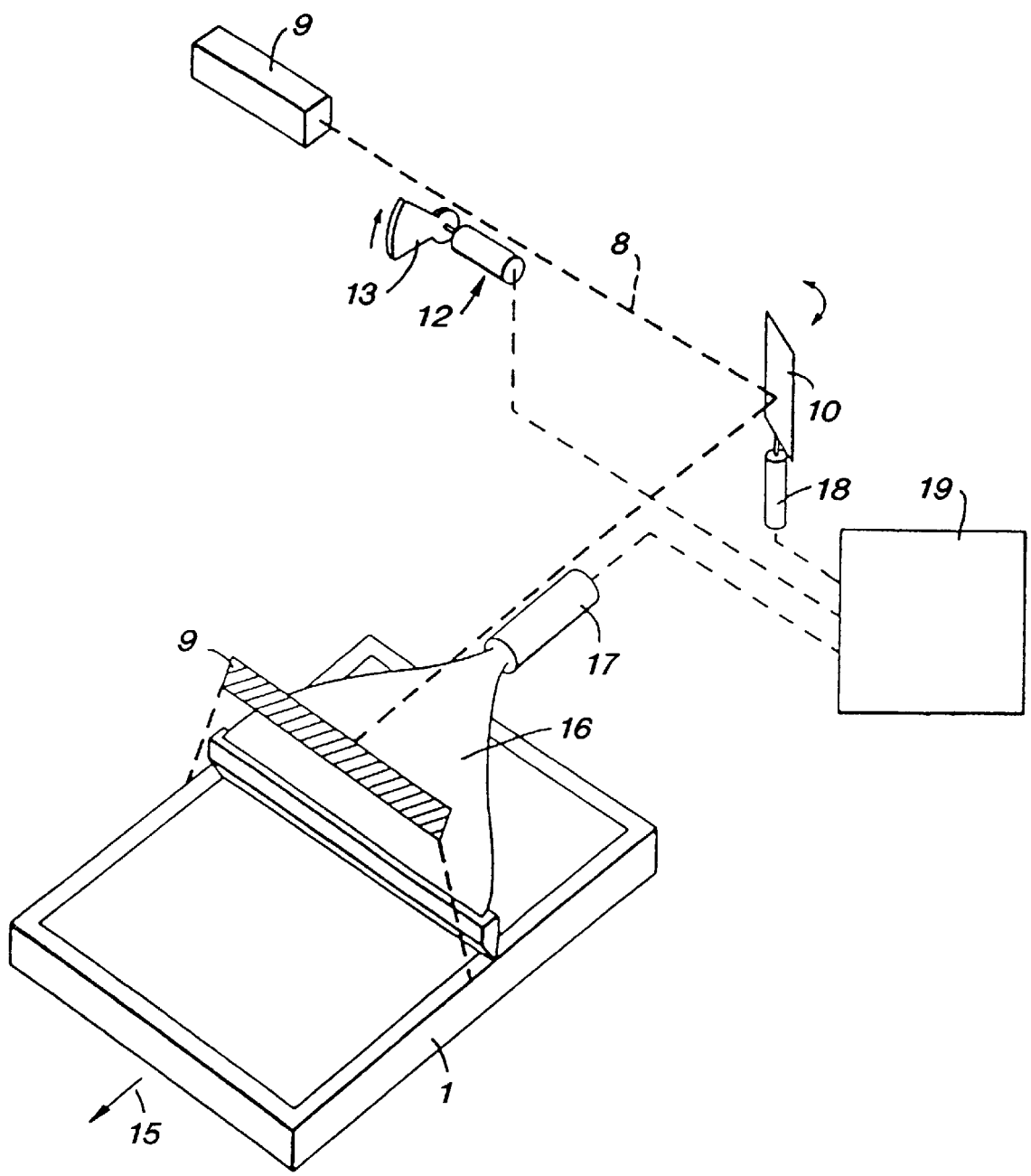
FIG. 2 is a detailed view of a system for reading an image stored in a photostimulable phosphor screen.
Figure 3:
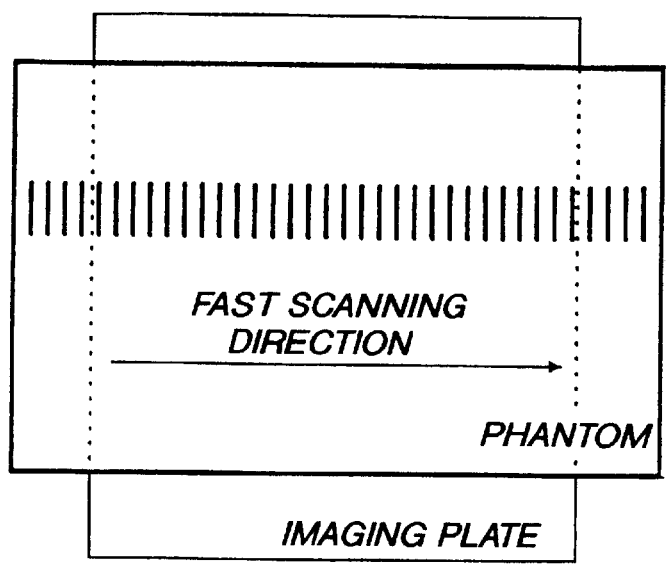
FIG. 3 illustrates the positioning of a phantom on top of a photostimulable phosphor screen for exposure of the screen-phantom combination.
Figure 5:
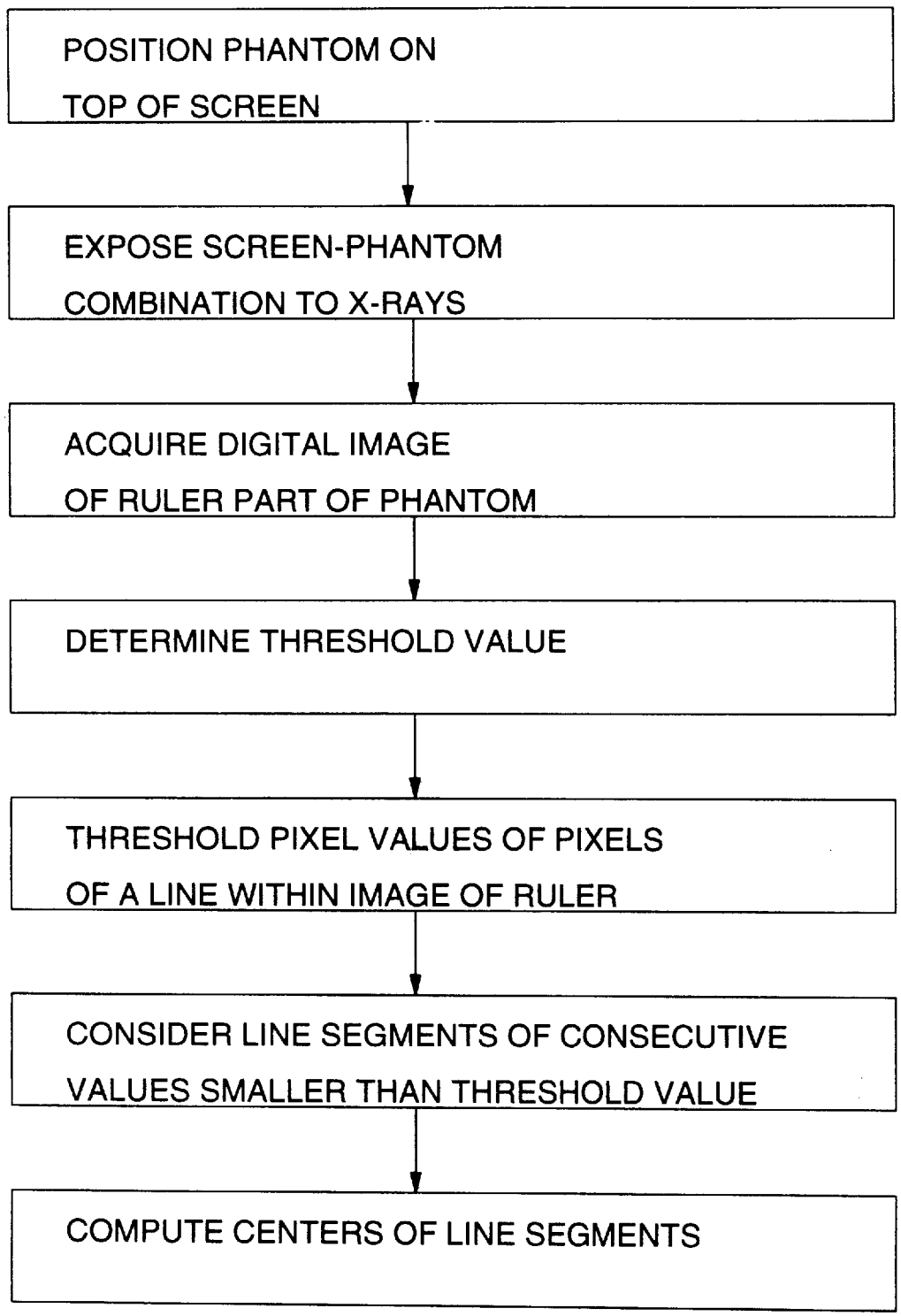
FIG. 5 is a flow diagram showing the method of the invention.

A simplified diagram illustrating the operation of the read-out apparatus is shown in FIG. 2. FIG. 5 shows a flow diagram of the verification steps using the phantom.

Read-out of an image stored in a photostimulable phosphor screen is performed by scanning the screen by means of a stimulating light beam 8 emitted by a light source 9 emitting light of a wavelength within the stimulating wavelength range of the phosphor used. For example a HeNe laser emitting at 633 nm is used.

A fast scan movement is obtained by directing the light beam emitted by a laser towards an oscillating scan mirror 10 that is driven by a galvanometer. Computer 19 and drive means 18 control the galvanometer movement under control of a triangular wave pattern.

A light chopper 12 with a rotating disc segment 13 is positioned in the laser beam path during the galvanometer retrace step.

Various laser beam focusing devices such as an F-theta lens, can be used to ensure a uniform beam diameter during scanning of the beam on the phosphor sheet and also ensure that the uniform angular velocity of the reciprocating mirror results in the laser spot travelling across the phosphor sheet at a uniform linear speed.

The laser beam is one-dimensionally deflected in a line direction by the galvanometer mirror 10 and a plane reflection mirror 9. The movement of the laser beam in the line direction is commonly referred to as fast scan movement.

The slow scan movement, i.e. the movement in a direction perpendicular to the fast scan movement, is provided by means of transport means that transport the screen at a uniform speed of in a direction perpendicular to the main scan direction to enable the whole sheet to be scanned in a uniform manner (direction of arrow 15).

Positioned close to, but behind the scanning line of the laser beam on the phosphor sheet, is a light guide 16 that receives light emitted from the phosphor sheet but is shielded from direct exposure to the laser beam. The output end of the light guide is positioned adjacent a photo-detector 17, which produces an electrical signal dependent upon the light intensity falling there on. Suitable electrical connections are made to pass the output signal from the photo-detector to a computer 19. This computer serves to control the light chopper 12 and the galvanometer mirror drive 18.

A sample and hold circuit and an analog-to-digital converter (not shown) are provided to convert the electric signal into a digital image signal.

The digital image signal is then fed to an image processing module (not shown) of the read-out apparatus where it is stored on a system disc.

The operation of the radiation image read-out apparatus is as follows. First the information stored in the EEPROM is read. In this way a test procedure is identified so that the image that will be read out is identified as a phantom image and will be analyzed according to a dedicated measurement procedure. Parameters to be used during execution of this dedicated measurement procedure are identified and can be retrieved from the system disc.

After identification of the screen and the associated processing menu (this is the test procedure), the scanning operation of the read out apparatus is started.

The exposed screen is scanned by means of laser light of the appropriate stimulating wavelength and the image emitted upon stimulation is detected and converted into an digital image representation.

The next is step is the analysis of the digital image of the measurement phantom so as to determine values for specific geometric parameters.

Since the phantom is aligned with respect to the image screen for each cassette format, the image of the ruler will be located at a fixed position within the image on the exposed screen up to some uncertainty, caused by some unavoidable inaccuracy of alignment.

The image row index $j_r$ corresponding to the approximate position of the ruler center line for the actual cassette format, is stored in advance as one of the parameters that pertains to a measurement program.

Upon reading an identifier associated with a measurement procedure from the EEPROM on the cassette conveying the photostimulable phosphor screen, the row index $j_r$ is fetched from a system data table. This table is permanently stored in the file system of the image read out device, and it contains all fixed system parameters, including those describing the phantom geometry.

In a first step the digital image data pertaining to 2K+1 consecutive rows of the image are taken into account. These data are vertically averaged (i.e. data pertaining to the same column in each of these 2K+1 lines of the matrix of read out pixels are averaged ) to reduce the effect of image noise. The following formula is applied to obtain average intensity values across the selected rows:

$$m_i = \frac{1}{2K+1} \sum_{j=j_r-K}^{j_r+K} g_{i,j}$$

where the horizontal coordinate i ranges from 0 through M-1. M is the number of pixels in each image row. The value of K is such that a band of 2K+1 pixels high, centered around the row with vertical coordinate $j_r$, is about half as wide as the imaged height of the ruler strips. This way it is assured that the image band within which averaging is applied, lies entirely within the ruler image, despite of small phantom misalignment errors. The parameter K is fetched from the system data table. $g_{i,j}$ are original image values, and m is an array representing average ruler intensity values $m_i$ across the image of the ruler.

Next the horizontal coordinates $i_s$ of the ruler strips are computed. At the position of the strips the average signal value $m_i$ is lower than between the strips. All segments of consecutive values of $m_i$ are considered that are below a threshold $m_T$. The bounds of each of those segments are denoted by $a_s$ and $b_s$ respectively.

The threshold value $m_T$ is computed as the average of the minimum and maximum of the values within the array of values $m_i$. The centroid position of each segment is then computed as:

$$c_S = \frac{\sum_{i=a_S}^{b_S} i(m_T - m_i)}{\sum_{i=a_S}^{b_S} (m_T - m_i)}$$

The strip centroid coordinates $c_s$ are stored on the system disc as an array, indexed from 0 through S. A maximum of 71 strip locations will be found when a 35 cm wide image screen was used.

Other techniques could be used to estimate the location of the ruler strips, but the centroid computation has the advantages of being quite unsensitive to noise and being precise as long as the intensity profile across the strip is symmetric, which is the case with the used kind of ruler.

The average distance between subsequent imaged strips:

$$\Delta c = \frac{1}{S}(c_s - c_o)$$

is used for computing the average pixel sampling distance:

$$\Delta x = p_{nom}/\Delta c$$

where $P_{nom}$ is nominal ruler pitch in mm, which is a phantom constant fetched from the system data table stored on the system disc. The average pixel sampling distance $\Delta x$, expressed in mm, is used to convert the measured distances (in pixel units or fractions thereof) into metric distances (mm).

The geometric distortion value is computed as:

$$dx_s = \Delta x \ (C_s - C_{[s/2]} - (s - [s/2]) \ \Delta c)$$

where [S/2] represents the truncated half of S, i.e. the index of the ruler strip at the center of the image.

If the image samples on a line were perfectly equidistant then geometric distortion value of zero will be found along the whole scanning line. In practice however small deviations in scanning linearity will cause minor fluctuations in sampling distance. The computed geometric distortion values $dx_s$ at the strip with index s indicates the difference in mm between the actual strip position and the position computed from its horizontal coordinate in the image, assuming a constant pixel sampling distance equal to $\Delta x$.

Figure 4:
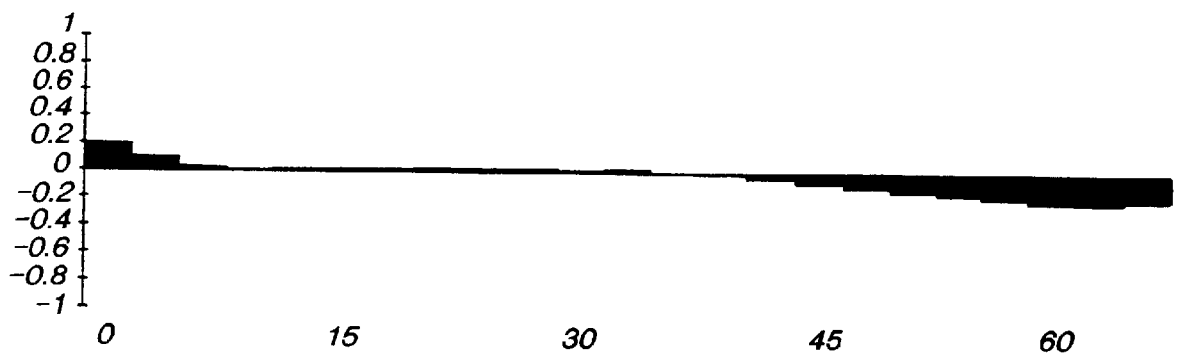
FIG. 4 illustrates the way in which the geometric distortion value can be displayed.

A plot of geometric distortion values as a function of s along the ruler is shown in FIG. 4. The parts of the plot where the local slope is negative indicate regions along the scanning line where the local sampling distance is larger than average. A positive slope at the other hand implies that the sampling distance is smaller than average. From the above formula it follows that the geometric distortion value is zero at the center of the image. The position of the zero reference is fixed by convention, but a different convention could easily be adopted by adding an offset to each of the distortion values, such that e.g. either the left most or right most image pixel has zero distortion, or such that the average distortion along the line is zero.

The total scanned width X is computed according to:

$$X = M\Delta x$$

Then a measurement report is created.

The following measured, computed, or stored parameters are communicated to the operator so that he can verify the geometric accuracy of the readout system: the array of geometric distortion values, the peak-to-peak geometric distortion value, the average sampling distance, the total scanned width, and the acceptance levels for these quantities.

The peak-to-peak geometric distortion value is the difference between the most extreme positive and negative geometric distortion values.

In addition the following identification data are listed: session identification number, measurement date, readout system serial number, software version, phantom type and serial number. The session identification number is incremented each time an image screen is read out.

All this information is presented as an overlay on top of the original image of the phantom. The digital signal representation of the image of the phantom as well as the measurement values are transmitted to a recorder 6 for reproducing the image of the phantom and the measurement values represented as an overlay on top of this image on one film 7.

The geometric distortion value is plotted as a graph. The other parameters are presented in textual form. The image with the superimposed results is either printed on hard-copy film, or it is displayed on a CRT monitor. The film hardcopy is kept with the machine as a quality record.

For each analyzed phantom image a report file is created which contains all the above data.

These report files are also stored on the system hard disk of the readout system. In the course of a service intervention the service technician can make a copy of these files onto a portable personal computer for archival in an electronic database. This way a historical overview of the status of individual machines can be maintained at the service department. Also statistics can be gathered concerning the accuracy of all installed machines.

We claim:

1. A method of verifying the performance of a system for line-wise scanning a photostimulable phosphor screen, comprising the steps of:

(i) positioning a phantom consisting of a substrate that is transparent to x-rays and an embedded ruler that consists of a number of equidistant parallel strips that are opaque to x-rays, on top of said screen so that the ruler is parallel with the direction of line-wise scanning, (ii) exposing a combination of screen and phantom to x-rays, (iii) scanning at least a part of the exposed screen comprising an image of said ruler by means of stimulating irradiation, detecting light emitted upon stimulation and converting the detected light into corresponding electric signal values representing a digital image, (iv) determining the position of each strip of said ruler with the position in the scanning direction of the center of each ruler strip being computed by:

thresholding signal values pertaining to pixels of a scanned line within an x-ray image of said ruler, by means of a threshold value $m_T$ that is the average of minimum and maximum of signal values pertaining to pixels within said line;

considering all segments along said line of consecutive signal values $m_i$ at positions i that are smaller than said threshold values $m_T$;

denoting $a_s$ as the first pixel and $b_s$ as the last pixel in said segments;

computing the position $c_s$ of the center of a segment according to $$c_S = \frac{\sum_{i=a_S}^{b_S} i(m_T - m_i)}{\sum_{i=a_S}^{b_S} (m_T - m_i)}$$

(v) determining at least one of the following parameters:

average pixel sampling distance as a ratio of a predetermined average distance between ruler strips and an average distance in the digital image of adjacent ruler strips computed by means of the determined position of each strip, geometric distortion value at a strip being the difference between a computed position of a ruler strip in the digital image and a predetermined position of a strip, total scanned width being the total number of image pixels in a scanning line multiplied by said average pixel sampling distance.

2. A method according to claim 1 wherein adjustments are performed to said system for line-wise scanning a photostimulable phosphor screen that are function of a difference of said determined parameters and acceptance values.

3. A method according to claim 2 modified in that signal values pertaining to pixels having the same position within a scanning line are averaged over a preset number of scanned lines within an image of said ruler.

4. A method according to claim 1 wherein said determined parameters are stored in a storage device in the line-wise scanning system.

5. A method according to claim 1 wherein in addition to a visible image of phantom an overlay image is produced comprising at least one of said parameters and a corresponding acceptance value.

* * * * *